United States Patent
Markantes et al.

(10) Patent No.: US 10,031,269 B2
(45) Date of Patent: *Jul. 24, 2018

(54) DURABLE OPTICAL INTERFERENCE PIGMENT WITH A BIMETAL CORE

(71) Applicant: VIAVI SOLUTIONS INC., Milpitas, CA (US)

(72) Inventors: Charles T. Markantes, Santa Rosa, CA (US); Cornelis Jan Delst, Fairfax, CA (US); Vladimir P. Raksha, Santa Rosa, CA (US); David De La Fuente, Rohnert Park, CA (US); Paul G. Coombs, Santa Rosa, CA (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,917

(22) Filed: Oct. 3, 2016

(65) Prior Publication Data

US 2017/0023714 A1  Jan. 26, 2017

Related U.S. Application Data

(63) Continuation of application No. 14/300,823, filed on Jun. 10, 2014, now Pat. No. 9,482,800.
(Continued)

(51) Int. Cl.
| | | |
|---|---|---|
| *C01B 21/064* | (2006.01) | |
| *G02B 5/28* | (2006.01) | |
| *G02B 5/00* | (2006.01) | |

(52) U.S. Cl.
CPC ............. *G02B 5/288* (2013.01); *G02B 5/003* (2013.01); *G02B 5/285* (2013.01)

(58) Field of Classification Search
CPC .............. C09C 1/0015; C09C 2220/20; C09C 2200/1054; C09C 1/0078;
(Continued)

(56) References Cited

U.S. PATENT DOCUMENTS

| | | |
|---|---|---|
| 2,570,856 A | 10/1951 | Pratt et al. |
| 3,011,383 A | 12/1961 | Sylvester et al. |

(Continued)

FOREIGN PATENT DOCUMENTS

| | | |
|---|---|---|
| DE | 39 38 055 | 5/1991 |
| DE | 43 13 541 | 10/1994 |

(Continued)

OTHER PUBLICATIONS

Related U.S. Appl. No. 13/733,792, filed Jan. 3, 2013; Inventor Name: Raksha, et al.
(Continued)

*Primary Examiner* — Alexandre F Ferre
(74) *Attorney, Agent, or Firm* — Mannava & Kang, P.C.

(57) ABSTRACT

In a plurality of asymmetric color-shifting flakes, each flake has an asymmetric magnetic core with a magnetic layer visible on the first side of the core and a non-magnetic reflector layer on the magnetic layer, visible on the second side of the core. The flake has a spacer layer and an absorber layer on the first side of the core, and also a spacer layer and an absorber layer on the second side of the core, for providing color shifting effects. The material of the magnetic layer is different from the material of the reflector layer, and may be more stable when exposed to a chemical. When a coating with the asymmetric color-shifting flakes is exposed to the chemical, it may have better optical performance than a coating with symmetric color-shifting flakes.

20 Claims, 3 Drawing Sheets

Related U.S. Application Data

(60) Provisional application No. 61/833,261, filed on Jun. 10, 2013.

(58) Field of Classification Search
CPC ........ C09C 2200/301; C09C 2200/304; C09C 1/0051; C09C 1/0066; C09C 2210/40; C09C 2200/303
See application file for complete search history.

(56) References Cited

U.S. PATENT DOCUMENTS

| | | | |
|---|---|---|---|
| 3,791,864 A | 2/1974 | Steingroever | |
| 3,926,659 A | 12/1975 | Bernhard et al. | |
| 4,105,572 A | 8/1978 | Gorondy | |
| 4,272,602 A | 6/1981 | Stemme et al. | |
| 4,323,904 A | 4/1982 | Edwards et al. | |
| 4,428,974 A | 1/1984 | Okita et al. | |
| 4,434,010 A | 2/1984 | Ash | |
| 4,552,593 A | 11/1985 | Ostertag | |
| 4,705,300 A | 11/1987 | Berning et al. | |
| 4,705,356 A | 11/1987 | Berning et al. | |
| 4,721,217 A | 1/1988 | Phillips et al. | |
| 4,756,771 A | 7/1988 | Brodalla et al. | |
| 4,779,898 A | 10/1988 | Berning et al. | |
| 4,838,648 A | 6/1989 | Phillips et al. | |
| 4,859,495 A | 8/1989 | Peng et al. | |
| 4,911,947 A | 3/1990 | Melcher et al. | |
| 4,930,866 A | 6/1990 | Berning et al. | |
| 4,978,394 A | 12/1990 | Ostertag et al. | |
| 5,009,486 A | 4/1991 | Dobrowolski et al. | |
| 5,002,312 A | 6/1991 | Phillips et al. | |
| 5,059,245 A | 10/1991 | Phillips et al. | |
| 5,084,351 A | 1/1992 | Phillips et al. | |
| 5,135,812 A | 8/1992 | Phillips et al. | |
| 5,171,363 A | 12/1992 | Phillips et al. | |
| 5,214,530 A | 5/1993 | Coombs et al. | |
| 5,217,804 A | 6/1993 | James et al. | |
| 5,242,617 A | 9/1993 | Metzger et al. | |
| 5,278,590 A | 1/1994 | Phillips et al. | |
| 5,279,657 A | 1/1994 | Phillips et al. | |
| 5,356,471 A | 10/1994 | Reynders | |
| 5,362,315 A | 11/1994 | Muller-Rees et al. | |
| 5,364,467 A | 11/1994 | Schmid et al. | |
| 5,364,689 A | 11/1994 | Kashiwagi et al. | |
| 5,549,774 A | 8/1996 | Miekka et al. | |
| 5,549,953 A | 8/1996 | Li | |
| 5,569,535 A | 10/1996 | Phillips | |
| 5,571,624 A | 11/1996 | Phillips et al. | |
| 5,573,584 A | 11/1996 | Ostertag et al. | |
| 5,593,773 A | 1/1997 | McKay et al. | |
| 5,607,504 A | 3/1997 | Schmid et al. | |
| 5,624,076 A | 4/1997 | Miekka et al. | |
| 5,624,486 A | 4/1997 | Schmid et al. | |
| 5,629,068 A | 5/1997 | Miekka et al. | |
| 5,630,877 A | 5/1997 | Kashiwagi et al. | |
| 5,648,165 A | 7/1997 | Phillips et al. | |
| 5,672,410 A | 9/1997 | Miekka et al. | |
| 5,683,622 A | 11/1997 | Kratzschmar et al. | |
| 5,733,976 A | 3/1998 | Sailer | |
| 5,763,086 A | 6/1998 | Schmid et al. | |
| 5,766,334 A | 6/1998 | Hashizume et al. | |
| 5,766,355 A | 6/1998 | Bujard et al. | |
| 5,766,738 A | 6/1998 | Phillips et al. | |
| 5,807,497 A | 9/1998 | Gailberger et al. | |
| 5,824,733 A | 10/1998 | Dobert et al. | |
| 5,830,567 A | 11/1998 | Panush | |
| 5,851,277 A | 12/1998 | Muller-Rees et al. | |
| 5,858,078 A | 1/1999 | Andes et al. | |
| 5,877,895 A | 3/1999 | Shaw et al. | |
| 6,013,370 A | 1/2000 | Coulter et al. | |
| 6,103,361 A | 8/2000 | Batzar et al. | |
| 6,150,022 A | 11/2000 | Coulter et al. | |
| 6,157,489 A | 12/2000 | Bradley, Jr. et al. | |
| 6,387,498 B1 | 5/2002 | Coulter et al. | |
| 6,808,806 B2 | 10/2004 | Phillips et al. | |
| 6,838,166 B2 | 1/2005 | Phillips et al. | |
| 6,875,522 B2 | 4/2005 | Seto et al. | |
| 7,047,883 B2 | 5/2006 | Raksha et al. | |
| 9,482,800 B2 * | 11/2016 | Markantes | G02B 5/285 |
| 2009/0072185 A1 | 3/2009 | Raksha | |

FOREIGN PATENT DOCUMENTS

| | | |
|---|---|---|
| DE | 43 40 141 | 6/1995 |
| DE | 44 19 173 | 12/1995 |
| EP | 353544 | 7/1990 |
| EP | 710508 | 10/1995 |
| EP | 686675 | 12/1995 |
| EP | 927749 | 7/1999 |
| EP | 927750 | 7/1999 |
| EP | 1239307 | 11/2002 |
| WO | 96/22336 | 7/1996 |

OTHER PUBLICATIONS

Related U.S. Appl. No. 14/043,497, filed Oct. 1, 2013; Inventor Name: Delst, et al.
Machine translation EP 0686675 (1995).

* cited by examiner

DURABLE OPTICAL INTERFERENCE PIGMENT WITH A BIMETAL CORE

CROSS-REFERENCE TO RELATED APPLICATIONS

The present application is a Continuation of commonly assigned and co-pending U.S. patent application Ser. No. 14/300,823, filed Jun. 10, 2014, which claims priority from U.S. Provisional Patent Application No. 61/833,261 filed Jun. 10, 2013 the disclosures of which are hereby incorporated by reference in their entireties.

TECHNICAL FIELD

The present disclosure relates generally to pigment flakes and, more particularly, to magnetically alignable optical interference pigment flakes.

BACKGROUND

A variety of thin film pigments have been developed for a wide variety of applications. For example, magnetic pigments are used in security devices as well as in decorative cookware. Color shifting pigments are part of anti-counterfeiting inks, automobile paints, and cosmetic preparations.

Color shifting pigments, colorants, and foils exhibit the property of changing color upon variation of the angle of incident light, or as the viewing angle of the observer is changed. The color-shifting properties of pigments and foils can be controlled through variation of parameters such as thickness of the layers forming the flakes and foils and the index of refraction of each layer. The changes in perceived color that occur for different viewing angles or angles of incident light are a result of a combination of selective absorption of the materials comprising the layers and wavelength dependent interference effects. The interference effects, which arise from the superposition of light waves that have undergone multiple reflections, are responsible for the shifts in color perceived with different angles. The reflection maxima changes in intensity and in position on the spectra, as the viewing angle changes, due to changing interference effects arising from light path length differences in the various layers of a material that are selectively enhanced at particular wavelengths.

The color shifting effects may be achieved by using pigment flakes, formed of multiple thin film layers so as to produce interference optical effects. Conventional 5-layer color-shifting flakes have the following symmetric design: absorber/dielectric/reflector/dielectric/absorber. The multilayer thin film structure may be formed on a flexible web material with a release layer thereon. The desired thin film layers are deposited on the web by methods well known in the art of forming thin coating structures, such as physical vapor deposition (PVD), sputtering, or the like. The multilayer thin film structure is then removed from the web as thin film color shifting flakes, which can be added to a polymeric medium such as various pigment vehicles for use as an ink or paint. When dispersed in a liquid or paste medium, the flakes may form color-shifting paint or ink, that may be subsequently applied to the surface of an object.

Eventually it was found that the use of color shifting pigment flakes may be further advanced by including a magnetic layer into a pigment flake. Such pigment flakes may be used for incorporation of a magnetic signature into a document. Aligning magnetic flakes with applied magnetic field may planarize the flakes in the binder so as to increase reflectivity of the coating, or may produce dynamic optical effects such as rolling bar or flip flop effects disclosed in U.S. Pat. No. 7,047,883 in the name of Raksha et al. incorporated herein by reference.

With regard to magnetic pigments, U.S. Pat. No. 4,838,648 to Phillips et al., incorporated herein by reference, discloses a thin film magnetic color shifting structure wherein the magnetic material, e.g. a cobalt nickel alloy, can be used as a reflector layer. However, such flakes provide less bright colors than similar flakes with an aluminum reflector.

EP 686675B1 in the name of Schmid et al. coats aluminum platelets with a magnetic material so as to form the following symmetric structure: oxide/absorber/dielectric/magnet/aluminum/magnet/dielectric/absorber/oxide. However, the overlying magnetic material downgrades the reflective properties of the pigment because aluminum is the second brightest metal (after silver), and thus any magnetic material is less reflective.

U.S. Pat. No. 6,838,166 in the name of Phillips et al., incorporated herein by reference, discloses color shifting pigment flakes with a magnetic layer sandwiched between two reflector layers formed of aluminum. The high reflectivity of the flakes is maintained because the duller magnetic material is hidden inside the reflector. U.S. Pat. No. 6,875,522 in the name of Seto et al., incorporated herein by reference, also discloses 7-layer flakes where a magnetic layer is hidden between two reflector layers, preferably made of aluminum. However, exposure of the flakes to an alkaline solution may result in decreased optical performance because aluminum corrodes in alkaline solutions.

A variety of applications may require chemical durability of pigment flakes or color shifting foils. For products and devices utilized for protection of security documents, there may be a requirement that the devices will function even after exposure to common environmental chemicals. The United States Department of the Treasury, when soliciting new security features and devices, specifically describes the desired level of chemical durability ("Counterfeit Deterrence Banknote Feature", Solicitation Number: SSR-05-0004). The US Treasury lists three chemical reagents to be utilized in the testing of candidate security features: aqueous sulfuric acid (H2SO4), aqueous sodium hydroxide (NaOH), and aqueous sodium hypochlorite ("bleach"). The security feature must survive exposure to these three chemicals reagents (as well as exposure to other chemicals such as organic solvents).

Accordingly, there is a need for improved magnetic pigment flakes and foils that overcome or avoid the deficiencies of prior flakes and foils.

SUMMARY

The present disclosure provides a plurality of asymmetric color-shifting flakes, wherein each flake has an asymmetric magnetic core with a first side and a second side, comprising a magnetic layer visible on the first side of the asymmetric magnetic core and a non-magnetic reflector layer on the magnetic layer, visible on the second side of the asymmetric magnetic core. The flake has a first spacer layer on the first side of the asymmetric magnetic core and a first absorber layer on the first spacer layer, for providing a first color shifting effect at the first side of the asymmetric magnetic core, and a second spacer layer on the second side of the asymmetric magnetic core and a second absorber layer on the second spacer layer, for providing a second color shifting effect at the second side of the asymmetric magnetic core.

Another aspect of the present disclosure relates to a plurality of asymmetric color-shifting flakes, wherein each includes an asymmetric core with a first side and a second side, comprising a first reflector layer visible on the first side of the asymmetric core and a second reflector layer on the first reflector layer, visible on the second side of the asymmetric core, wherein the first reflector layer is made of a material different from a material of the second reflector layer. The flake has a first spacer layer on the first side of the asymmetric core and a first absorber layer on the first spacer layer, for providing a first color shifting effect at the first side of the asymmetric core, and a second spacer layer on the second side of the asymmetric core and a second absorber layer on the second spacer layer, for providing a second color shifting effect at the second side of the asymmetric core.

BRIEF DESCRIPTION OF THE DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

DETAILED DESCRIPTION

The conventional approach for improving chemical durability of the seven-layer color-shifting magnetic flakes is to encapsulate the flakes with an inert material. However, this would complicate the manufacturing process and increase the cost of the pigment. Another approach for increasing chemical durability is disclosed herein. Rather unexpectedly, removing a layer from the seven-layer design may increase chemical durability of the pigment. In comparison to the conventional symmetric seven-layer design, the flakes described herein may be based on the asymmetric six-layer design: absorber/dielectric/reflector/magnetic/dielectric/absorber, wherein the omission of a second reflector layer results in better durability of a color shifting coating formed with such flakes.

Figure 1:
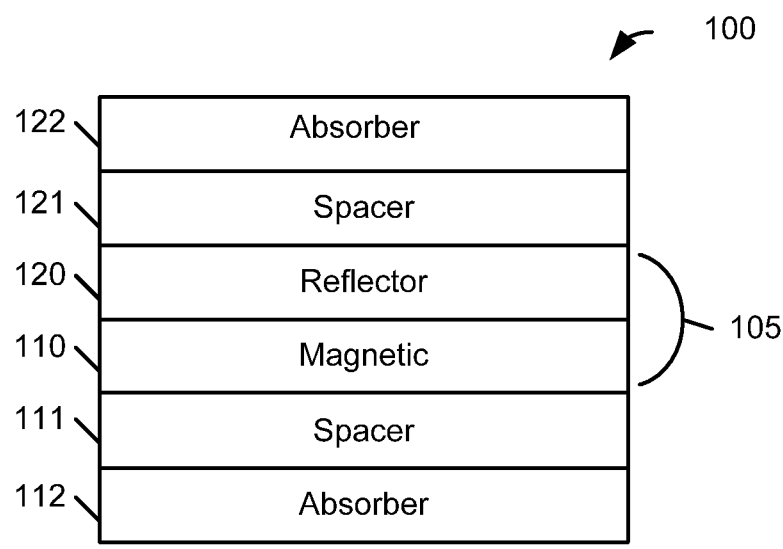
FIG. 1 illustrates a schematic diagram of a pigment flake in accordance with an exemplary embodiment.

With reference to FIG. 1, an asymmetric flake 100 may have an asymmetric magnetic core 105 which may include a magnetic layer 110 and a reflector layer 120. On a first side of the magnetic core 105, there may be a first spacer layer 111 on the magnetic layer 110, and a first absorber layer 112 on the first spacer layer 111. On a second side of the magnetic core 105, there may be a second spacer layer 121 on the reflector layer 120, and a second absorber layer 122 on the second spacer layer 121.

The magnetic layer 110 may be visible at the first side of the magnetic core 105 in the sense that a portion of light incident on the first absorber 112 reflects from the magnetic layer 110 and participates in forming a first interference-based color-shifting effect on one side of the flake 100, at the first side of the asymmetric magnetic core 105. The reflector layer 120 may be visible at the second side of the magnetic core 105 in the sense that a portion of light incident on the second absorber 122 reflects from the reflector layer 120 and participates in forming a second interference-based color-shifting effect on another side of the flake 100, at the second side of the asymmetric magnetic core 105.

The pigment design disclosed herein exploits the fact that the reflector 120 and the magnetic layer 110 are made of different materials and thus may react differently when exposed to a particular chemical. A plurality of asymmetric flakes disclosed with reference to FIG. 1 may be disposed in a carrier, such as ink or paint carrier, and applied to an object. Approximately half of the flakes turn with the "magnetic" side up, and another half—with the "reflector" side up, so that the optical effect provided by the coating averages the first and second color shifting effects provided on different sides of the asymmetric flake 100. When the pigment is exposed to a chemical which may damage the reflector layer but not the magnetic layer, the optical performance of the "reflector" side" of the flakes may degrade whereas the performance of the "magnetic" side does not change. Accordingly, half of the flakes in the coating still shows the undamaged side and provide the color shifting effect.

Alternatively, when the exposure is damaging to the magnetic layer while the reflector is stable (by way of example, iron is sensitive to acid, while aluminum is not), the resulting color shifting effect is mostly contributed to by the flakes with the "reflector" side up. To make the damage less noticeable to an observer, the first color shifting effect provided on one side of an (undamaged) flake may be close to the second color shifting effect provided on the second side of the flake, when light is incident on the first or second side, respectively.

By way of example, aluminum is stable in acidic solutions but may be damaged in alkaline solutions. The alkaline solution may dissolve the film of aluminum oxide naturally occurring on the metal surface. Then, the exposed aluminum reacts with water so that the reflective properties of the surface significantly deteriorate. As a result, conventional 7-layer optically-variable pigments with aluminum reflectors on both sides of a magnetic layer may be weak, i.e. their optical performance deteriorates, in alkaline solutions, but may have quite reliable performance in acidic solution. On the contrary, many magnetic materials are more stable in basic solutions than in acidic. Therefore, pigments with a magnetic reflector, such as nickel or iron, may have stable performance in alkaline solutions but weak in acids.

It was suggested that using asymmetric flakes with a bimetal core which has a reflector on one side and a magnetic layer on the opposite side, may increase the overall chemical durability of the coating relative to at least one damaging chemical.

Table 1 below presents experimental result for a particular magnetic pigment which has the design illustrated in FIG. 1. The reflector 120 was an opaque aluminum layer, a ferro-chromium composite (FCC) was used for the magnetic layer 110, the dielectric spacer layers 11 and 121 were made of $MgF_2$, and the absorber layers 112 and 122—of chromium. In terms of its constituent materials thickness, the 5-layer flakes may be described as follows: Cr 5 nm/MgF2 500 nm/Al 30 nm/FCC 30 nm/MgF2 500 nm/Cr 5 nm. The same layers were used in experiments for making the 6-layer foils and flakes, whereas the magnetic layer FCC was 30 nm thick. The magnetic pigment flakes were dispersed in a carrier, and the composition was printed onto a flat substrate. There was no visual difference detectable to a naked human eye in the color performance of this print and a color of the print made with a conventional 5-layer $Cr/MgF_2/Al/MgF_2/$ Cr pigment. However, instrumental measurements detected the difference as illustrated in Table 1, which presents measurements (in CIELab units) of optical performance for the two types of foils which would become pigments after the layered coating is stripped from the deposition substrate, the 5-layer non-magnetic pigment and the 6-layer asymmetric magnetic pigment, and their absolute and relative difference in lightness (L*) and chroma (C*).

TABLE 1

|  | L* | C* |
| --- | --- | --- |
| Cr/MgF2/Al/MgF2/Cr | 66.45 | 55.04 |
| Cr/MgF2/Al/FCC/MgF2/Cr | 63.02 | 50.61 |
| Difference (CIELab units) | −3.43 | −4.43 |
| Percent Difference- | −5.2% | −8.0% |

Another experiment was conducted in order to compare optical properties of magnetic pigment flakes, which had a single reflector made of a magnetic material FCC, with conventional non-magnetic flakes containing an aluminum reflector. Both color-shifting interference pigments had the 5 layer design: absorber/dielectric/reflector/dielectric/absorber, with different materials used for the reflector layer. Both pigments included semi-transparent chromium absorber layers of a same thickness and transparent dielectric layers of a same optical thickness.

Dispersed in fluid organic binder and printed on a flat substrate, the magnetic pigment exhibited very good alignment caused by application of external magnetic field. However, the optical performance of the pigment with FCC reflector was worse than the optical performance of the pigment with an aluminum reflector. Table 2 illustrates the difference between the lightness (L*) and chroma (C*) measured in CIELab units of a PET substrate coated with formulations of magnetic or non-magnetic pigments in a carrier.

TABLE 2

|  | L* | C* |
| --- | --- | --- |
| Cr/MgF2/Al/MgF2/Cr | 83.84 | 84.31 |
| Cr/MgF2/FCC/MgF2/Cr | 78.93 | 73.19 |
| Difference (CIELab units) | −4.91 | −11.12 |
| Percent Difference | −5.9% | −13.2% |

Table 2 indicates the 13.2% decrease in the optical performance when the aluminum reflector is replaced with a magnetic reflector. The difference may be inacceptable for printing color-shifting security elements.

Relative to Table 1, the difference in instrumental measurements at 8% resulted in no visual difference in optical performance, i.e. an observer could see no difference with a naked eye. Such difference is acceptable for printing of security features.

Since the optical performance of magnetic flakes based on the 7-layer design where the magnetic layer is hidden between two aluminum layers is the same as of the 5-layer flakes with a single aluminum layer, the experiments described above confirm that it is possible to "remove" one reflector layer from the conventional 7-layer design for magnetic color shifting flakes without degradation in optical performance of corresponding coatings visible to a naked human eye. In other words, a naked human eye identifies no difference between the coatings formed with symmetric 7-layer flakes and asymmetric flakes based on the 6-layer design with a bi-metal magnetic core. Accordingly, the "removal" of a reflector layer from the 7-layer design simplifies the manufacturing process and makes the pigment more cost effective without degradation of optical performance noticeable to a naked human eye, or with little degradation depending on the choice of the materials.

As discussed above, with possible exposure to corrosive environment, the 6-layer pigment may perform better in a coating than the 5-layer pigment with an aluminum reflector, and thus better than the 7-layer pigment with a magnetic layer hidden between two reflectors. In other words, the asymmetric design with a bi-metal core, also referred above as a pigment with a "removed" reflector, may provide the double advantage of lowering the cost and improving the chemical durability.

The US Treasury lists three chemical reagents to be utilized in the testing of candidate security features: aqueous sulfuric acid (H2SO4), aqueous sodium hydroxide (NaOH), and aqueous sodium hypochlorite ("bleach"). A security feature, e.g. a coating with color-shifting flakes, must survive exposure to these three chemicals reagents as well as exposure to other chemicals such as organic solvents.

The aforementioned 6-layer pigment flakes were tested for chemical durability alongside products described in the prior art. The pigments were exposed to the three chemical reagents specified in BEP Solicitation Number SSR-05-0004: aqueous sulfuric acid (H2SO4), aqueous sodium hydroxide (NaOH), and aqueous sodium hypochlorite ("bleach"). Tests were carried out according to standard test method JDSU 02252002-YQ4X-S24N based on BEP test method STM 300.003.

The durability of pigments was evaluated with a pigment reagent durability index (PRDI) which allows for durability comparison between various pigments. The PRDI takes into account the resistance to aqueous H2SO4 ("acid"), aqueous NaOH ("base"), and aqueous sodium hypochlorite ("bleach"), and is represented mathematically by the following formula:

$$100 \times [\Delta E^*_{base} + \Delta E^*_{acid} + \Delta E^*_{bleach}]^{-1}$$

The three components, ΔE*base, ΔE*acid, and ΔE*bleach, represent the measured change in color (ΔE*ab in CIELab units), experienced by a given candidate sample during the exposure to the aqueous chemical reagents. The change in color (ΔE*ab) is calculated by measuring samples both before and after exposure to the chemical reagents. The highly colorful optical interference pigments of the design disclosed herein may have face-color chromaticity values (C*) in the range of 40 to 60 units.

Highly-chromatic candidate pigments (for example, pigments having initial chroma values of 30-60 units) are not equal in their resistance to chemical attack. In the extrema, highly-durable candidate pigments may only change an amount in the range of 0.5 to 1.0 units during the test, while low-durability candidate pigments can change as much as, perhaps 30 units during the same exposure. Thus the realistic extrema for the calculated PRDI will be $100 \times [1.0+1.0+1.0]^{-1} = 33.3$ for excellent samples down to $100 \times [30+30+30]^{-1} = 1.11$ for poor samples.

Sample pigments of the design disclosed herein with reference to FIG. 1 were tested against sample pigments described in U.S. Pat. No. 6,818,299 incorporated herein by reference, with the following design: Cr 5 nm/MgF2 500 nm/Al 30 nm/FM 50 nm/Al 30 nm/MgF2 500 nm/Cr 5 nm, where FM may be any magnetically soft FerroMagnetic metal: ferro-chrom, nickel, cobalt, iron, permalloy or any other magnetic alloys, magnetic ceramics, etc. Samples made using bi-metal-core pigment demonstrated an enormous improvement in chemical reagent durability when compared to samples with prior art pigments. The experimental results are provided in Table 3.

TABLE 3

| Sample Type | Pigment Design | Durability Index, PRDI |
|---|---|---|
| Prior art | Cr/MgF$_2$/Al/FCC/Al/MgF$_2$/Cr | 5.6 |
| Bi-metal core | Cr/MgF$_2$/(Al/FCC)/MgF$_2$/Cr | 10.5 |

Samples made with novel 6-layer flakes with a bi-metal core demonstrated a durability index almost twice as high as the index for the prior art samples (10.5 versus 5.6). Thus, the bi-core multi-layer design allows for higher durability—a key performance criteria used in the selection of devices which are suitable for protection of security documents.

The reflector layer 120 may be made of aluminum or silver. Suitable metals include platinum, tin, titanium, and stainless steel. Other metals, alloys, and combinations of metals may also be used. Suitable materials for the magnetic layer 110 include nickel, cobalt, iron, and their compositions and alloys. Of course, other metals and alloys may be used.

The pair of materials for the reflector layer 120 and the magnetic layer 110 may be chosen based on two criteria.

Figure 2:
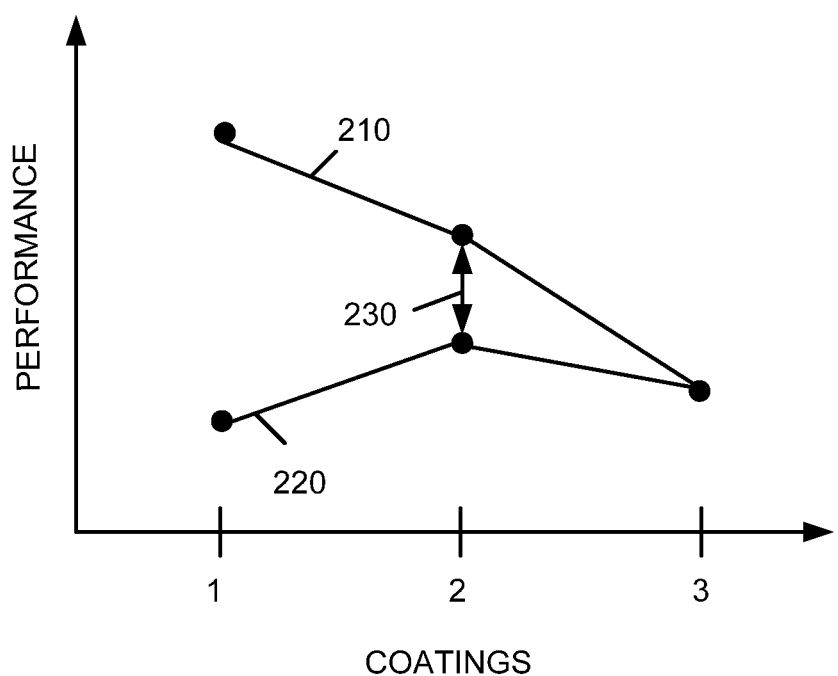
FIG. 2 illustrates optical performance of different pigments in accordance with an exemplary embodiment.

In order improve chemical durability relative to at least one possibly damaging chemical, one of the two layers should perform better than the other of the two layers. That may be detected by comparing optical properties of three coatings made with a same binder and different only in the their reflective cores. The first coating contains 5 layer flakes wherein the central reflector layer is same as the reflector layer 120. The second coating contains the 6 layer flakes such as shown in FIG. 1, wherein the reflective core includes the reflector layer 120 and the magnetic layer 110. The third coating contains 5 layer flakes wherein the central reflector layer is identical to the magnetic layer 110. With reference to FIG. 2, without exposure to aggressive environment, the first coating would have the best optical performance, and the third—the worst, as illustrated by the curve 210. This result is expected since the reflectance of the reflector layer 120 is greater than the reflectance of the magnetic layer 110. When coatings are exposed to a corrosive environment to one of the reflector 120, the performance of the second coating may be the best, or at least better than that of the first coating, which would prove that the 6-layer design is more durable when exposed to that particular chemical than the 5-layer design or the 7-layer design which has the reflective core formed by a magnetic layer hidden between two reflector layers and has the same optical properties as the 5-layer design with a single reflector 120. The curve 220 illustrates optical performance of the coatings possibly damaged by exposure to a particular chemical. It should be noted that FIG. 2 represents a hypothetical experiment, and the accuracy of the plots should not be relied on.

For quality optical performance in normal conditions, and to reduce the change caused by the damage shown as a decrease 230 in FIG. 2, it is desirable that the first and second optical effects exhibited by the flakes 100 be as close as possible. The absorber layer 112 may have same material and thickness as the absorber layer 122, and the dielectric spacer layer 111 may have a same optical thickness, and possibly same material and physical thickness, as the dielectric spacer layer 121. It is also preferable to have the reflectance of the magnetic layer 110 close to the reflectance of the reflector layer 120.

Suitable materials for the dielectric spacer layers 111 and 121 are known in the industry and include zinc sulfide (ZnS), zinc oxide (ZnO), zirconium oxide (ZrO.sub.2), titanium dioxide (TiO.sub.2), silicon dioxide (SiO.sub.2), aluminum oxide (Al.sub.2 O.sub.3), magnesium fluoride (MgF.sub.2), etc. Each of the dielectric layers can be formed of a single material or with a variety of material combinations and configurations. For example, the dielectric layers may include multiple sublayers. Suitable low refractive index materials for dielectric layers include silicon dioxide (SiO$_2$), aluminum oxide (Al$_2$O$_3$), metal fluorides such as magnesium fluoride (MgF$_2$), aluminum fluoride (AlF$_3$), cerium fluoride (CeF$_3$), lanthanum fluoride (LaF$_3$), sodium aluminum fluorides (e.g., Na$_3$AlF$_6$ or Na$_5$Al$_3$F$_{14}$), neodymium fluoride (NdF$_3$), samarium fluoride (SmF$_3$), barium fluoride (BaF$_2$), calcium fluoride (CaF$_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The absorber layers 112 and 122 may be composed of any absorber material having the desired absorption properties, including materials that are uniformly absorbing or non-uniformly absorbing in the visible part of the electromagnetic spectrum. Nonlimiting examples of suitable absorber materials include chromium, aluminum, nickel, silver, copper, palladium, platinum, as well as their corresponding oxides, sulfides, and carbides. The absorber layers 112 and 122 are partially absorbing and partially light transmissive, so each has a physical thickness in the range from about 3 nm to about 50 nm.

Figure 3:
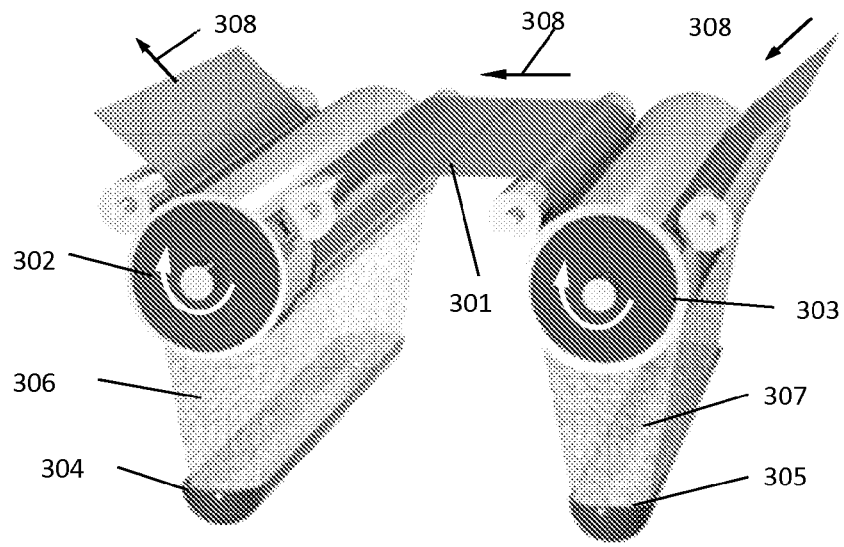
FIGS. 3 and 4 illustrate schematic diagrams of a manufacturing process in accordance with an exemplary embodiment.

With reference to FIG. 3, a 2-roll web coating machine may be used in the pigment manufacturing process. The deposition substrate also referred as web 301 may be wrapped around cooled drums 302 and 303. The drums may be installed at a distance above sources 304 and 305 of materials that need to be deposited as thin films on the web 301. The materials from the sources 304 and 305 may be converted to the vapor streams 306 and 307 by evaporation of the source material, by sputtering or another suitable method. The web may be moved forth and back (to the left or to the right) with respect to the source materials. Directions of the web for the left hand winding in the FIG. 3 are illustrated by the arrows 308. Usually dielectric is evaporated from one source and the metals from another source.

Figure 4:
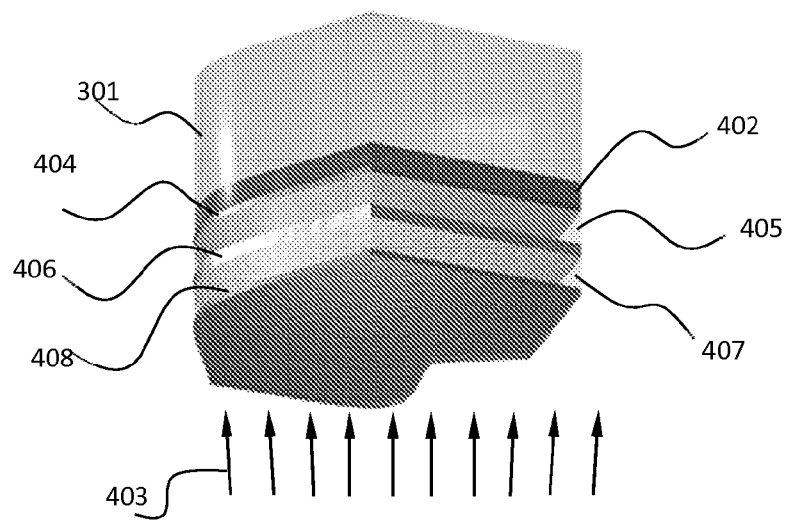

The polyester web in FIG. 4, also known as polyethylene terephthalate (PET), may be used as a temporary substrate for the pigment in the process of its manufacturing. For manufacturing of 5-layer pigment, the web 301 may be coated with a layer of thin organic resin 402 as a release agent. Chromium in a vapor phase comes along direction 403 from the source material (not shown in the picture) and condenses on the web as the layer 404. The layer 405 of MgF2 may be deposited on the top of chromium absorber followed by opaque layer 406 of aluminum. Another dielectric layer 407 may be deposited on the top of aluminum, and the layer 408 of semi-transparent chromium may be deposited on the top of the layer 407.

In manufacturing, the absorber layer 112 (FIG. 1) may be deposited onto the web coated with the release layer, then the spacer layer 111 may deposited onto the absorber 112, then the magnetic layer 110. The reflector layer 120 may be deposited on the magnetic layer 110. Preferably, the reflector 120 is deposited directly on the magnetic layer 110 so that the two layers are in direct contact, or another layer may be provided on the magnetic layer 110 e.g. for insulation, and further covered with the reflector layer 120. However, the addition of more layers between the reflector and magnetic layers would disadvantageously affect the cost of the manufacturing process. The spacer 121 and absorber 122 may be deposited on the reflector 120.

Of course, the layers may be deposited in a reverse order, starting with the second absorber 122 on the release layer atop of the deposition substrate, followed by the second dielectric layer 121, the reflector 120, optional insulator, magnetic layer 110, first dielectric layer 111, first absorber layer 102. The materials for the dielectric spacer layers 111 and 121 and for the absorber layers 112 and 122 may be chosen so that the first and second color shifting effects are as close as possible, preferably appear same to a naked human eye. In one embodiment, the first dielectric spacer layer 111 may be formed of a same material and have a same thickness as the second spacer layer 121, and the first absorber layer 112 may be formed of a same material and have a same thickness as the second absorber layer 122.

Alternatively, the first and second absorber layers may form a single absorber layer surrounding the core, the first and second spacer layers may form a single spacer layer surrounding the core, and/or each flake may be encapsulated with a protective coating surrounding the flake.

The general idea behind the 6-layer design for durable color shifting flakes is to have two interference filters back-to-back. Each of the two filters may have the conventional absorber/spacer/reflector design for providing a color shifting effect. The reflector of the first filter is made of a material different from the material of the second reflector so that the two reflectors are differently affected by exposure to a particular possibly damaging chemical.

FIG. 1 illustrates an embodiment where the two different reflector layers are embodied in the magnetic reflector 110 and the non-magnetic reflector 120 which has the reflectance greater than the reflectance of the magnetic layer 110. In FIG. 1, one of the two interference filters is formed by the layers 112, 111, and 110, and the second interference filter— by the layers 122, 121, and 120.

Optionally, other layers may be interspersed between the two interference filters, e.g. to improve rigidity of the fake or provide insulation between the two metal layers. The difference between the reflectors and the additional layer is that each of the two reflectors (110 and 120 in FIG. 1) participate in forming color shifting effects and thus are visible if light is incident on that side of the flake, whereas the additional layer(s) are hidden between the two opaque reflectors and thus is invisible. One of the two reflectors may be made of a magnetic material as the magnetic reflector 120 which is also referred to above as the magnetic layer. However, the asymmetric bi-metal core is not necessary magnetic. For improved durability, it is necessary to have a first of the two metals to be more stable than a second metal to exposure of one type of aggressive chemicals, e.g. to acidic solutions and show a $\Delta E^*_{acid}$ of less than 10 CIELab units in the experiments described above. The second metal may be more stable than the first metal to another type of aggressive chemicals, e.g. alkaline solutions and show a $\Delta E^*_{base}$ of less than 10 CIELab units in the experiments described above. It is desirable for both metals to have satisfactory reflectance, e.g. not less than 50%.

Figure 5:
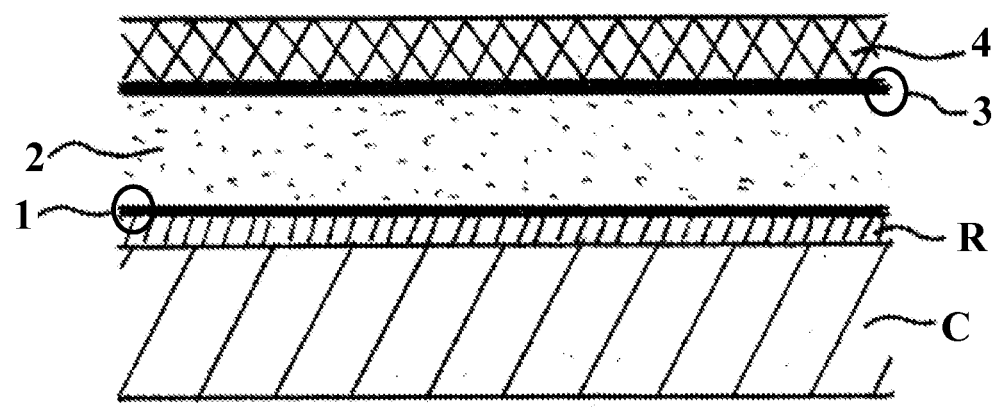
FIG. 5 is a prior art schematic diagram of a pigment flake.

EP1239307 by SICPA refers to a magnetic thin film interference device showing a viewing-angle dependent color-appearance. The pigment is made of a multi-layer stack including at least one light-reflecting reflector layer 3, at least one light-transmitting dielectric layer 2, at least one light-absorbing absorber layer 1 and at least one magnetic layer 4. For example, at least one light-absorbing absorber layer 1 is deposited on a release-coated R carrier foil. The magnetic layer 4 is separated from a dielectric layer 2 by a reflector layer 3. According to a first preferred embodiment of a magnetic optically variable pigment (OVP) the magnetic layer 4 is symmetrically confined within two reflector layers, resulting in equal optical properties of the magnetic OVP along two reflector layer sides. According to a second preferred embodiment of a magnetic OVP, the magnetic layer 4 is adjacent to only one reflector layer 3, resulting in an asymmetrically magnetic OVP with optical properties along solely one reflector layer side. Schematic construction of the asymmetric pigment exhibiting optical properties along only one reflector layer side is illustrated in FIG. 5 (FIG. 3 of the EP1239307).

Optical performance of such pigment is very low because silver or metallic reflectance of metallic side greatly reduces chroma of the coating made with such pigment. 50% of particles of this pigment will face the surface of the coating printed on a flat substrate with colored side and remaining 50% of particles will face the surface with their metallic side. The pigment design according to exemplary embodiments, with a bi-metal core, may provide a great improvement over EP1239307 because both sides of the pigment exhibit a color-shifting effect.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

We claim:

1. An asymmetric color-shifting flake comprising:
   an asymmetric magnetic structure with a first side and a second side, comprising a magnetic layer on the first side of the asymmetric magnetic structure and a non-magnetic reflector layer on the magnetic layer, on the second side of the asymmetric magnetic structure;
   a first spacer layer on the first side of the asymmetric magnetic structure and a first absorber layer on the first spacer layer; and
   a second spacer layer on the second side of the asymmetric magnetic structure and a second absorber layer on the second spacer layer.

2. The flake as defined in claim 1, wherein the first spacer layer is at least partially transparent.

3. The flake as defined in claim 1, wherein at least one of the magnetic layer and the non-magnetic reflector layer is stable upon exposure to a chemical reagent.

4. The flake as defined in claim 1, wherein the magnetic layer is more stable when exposed to an alkaline solution than the non-magnetic reflector layer.

5. The flake as defined in claim 1, wherein the non-magnetic reflector layer comprises aluminum.

6. The flake as defined in claim 3, wherein the chemical reagent is aqueous sulfuric acid ($H_2SO_4$).

7. The flake as defined in claim 3, wherein the chemical reagent is sodium hydroxide (NaOH).

8. The flake as defined in claim 3, wherein—the chemical reagent is aqueous sodium hypochlorite.

9. The flake as defined in claim 1, wherein the flake consists of six layers including the non-magnetic reflector layer, the magnetic layer, the first and second spacer layers, and the first and second absorber layers.

10. The flake as defined in claim 1, wherein the flake omits a second reflector layer.

11. The flake as defined in claim 1, wherein the flake exhibits a calculated PRDI ranging from 33.3 to 1.11.

12. A coating composition comprising a carrier and a plurality of asymmetric color-shifting flakes as defined in claim 1, dispersed therein.

13. The coating composition as defined in claim 12, applied to a surface, wherein the plurality of asymmetric color-shifting flakes are magnetically aligned.

14. The coating composition as defined in claim 12, wherein a portion of the plurality of asymmetric color-shifting flakes are turned with the magnetic layer side up, and another portion of the plurality of asymmetric color-shifting flakes are turned with the non-magnetic reflector layer side up.

15. An asymmetric color-shifting flake comprising:
an asymmetric structure with a first side and a second side, comprising a first reflector layer on the first side of the asymmetric structure and a second reflector layer on the first reflector layer, on the second side of the asymmetric structure, wherein the first reflector layer is made of a material different from a material of the second reflector layer;
a first spacer layer on the first side of the asymmetric structure and a first absorber layer on the first spacer layer; and,
a second spacer layer on the second side of the asymmetric structure and a second absorber layer on the second spacer layer,
wherein at least one of the first reflector layer and the second reflector layer is stable upon exposure to a chemical reagent.

16. The flake as defined in claim 15, wherein the flake omits a third reflector layer.

17. The flake as defined in claim 15, wherein the first and second absorber layers form a single absorber layer that surrounds the asymmetric structure.

18. The flake as defined in claim 15, wherein the first and second spacer layers form a single spacer layer that surrounds the asymmetric structure.

19. The flake as defined in claim 15, wherein the first reflector layer exhibits a $\Delta E^*$ of less than about 10 CIELab units when exposed to the chemical reagent.

20. A method of making the asymmetric color-shifting flake of claim 15, comprising:
depositing a first absorber layer onto a web;
depositing a first spacer layer onto the first absorber layer;
depositing a magnetic layer onto the first spacer layer;
depositing a reflector layer onto the magnetic layer;
depositing a second spacer layer on the reflector layer; and
depositing a second absorber layer on the second spacer layer.

* * * * *